United States Patent [19]

Schwieger

[11] 4,377,130
[45] Mar. 22, 1983

[54] ANIMAL ACTUATED FEED AND WATER DISPENSING APPARATUS

[76] Inventor: Lonny D. Schwieger, Rte. 1, Box 93A, Fairmont, Minn. 56031

[21] Appl. No.: 298,274

[22] Filed: Aug. 31, 1981

[51] Int. Cl.³ .......................... A01K 5/00; A01K 7/06
[52] U.S. Cl. ................................. 119/51.5; 119/53.5; 119/54
[58] Field of Search ....................... 119/54, 53.5, 51.5

[56] References Cited

U.S. PATENT DOCUMENTS

| 961,779 | 6/1910 | Kellum | 119/54 |
| 1,175,124 | 3/1916 | Clough | 119/53.5 |
| 1,222,556 | 4/1917 | McCormick | 119/54 |
| 1,311,691 | 7/1919 | Hamilton | 119/53.5 |
| 1,395,307 | 11/1921 | Stuart | 119/53.5 |
| 2,640,464 | 6/1953 | Jindrich | 119/54 |
| 2,966,135 | 12/1960 | Kelley et al. | 119/53.5 |
| 3,536,046 | 10/1970 | Lippi | 119/51.5 |
| 4,242,985 | 1/1981 | Freeborn | 119/54 |

FOREIGN PATENT DOCUMENTS 2750163  5/1979  Fed. Rep. of Germany ........ 119/54
432749  8/1935  United Kingdom ............... 119/53.5

Primary Examiner—Hugh R. Chamblee
Attorney, Agent, or Firm—Peterson, Palmatier, Sturm, Sjoquist & Baker, Ltd.

[57] ABSTRACT

An animal feeding apparatus includes a bunk, or trough for receiving solid feed and water and animal actuated hopper means disposed over the trough. The water dispensing function is provided by a plurality of valves having operators to be actuated, preferably, by the snout of an animal and which are configured and disposed to inhibit actuation by the animal at such times as the level of liquid in the bunk exceeds a predetermined depth. The feed dispensing function is provided by the simultaneous actuation of an elongated agitator, disposed on one side wall of the hopper and in a dispensing slot in the bottom of the hopper, and a grate, disposed above the agitator and adjacent the slot and the opposite side wall of the hopper, by an agitator arm connected to the agitator and the grate, and extending downwardly into the bunk for actuation by an animal. The agitator and the grate are pivotable about a common axis to provide different radii of oscillation.

11 Claims, 5 Drawing Figures

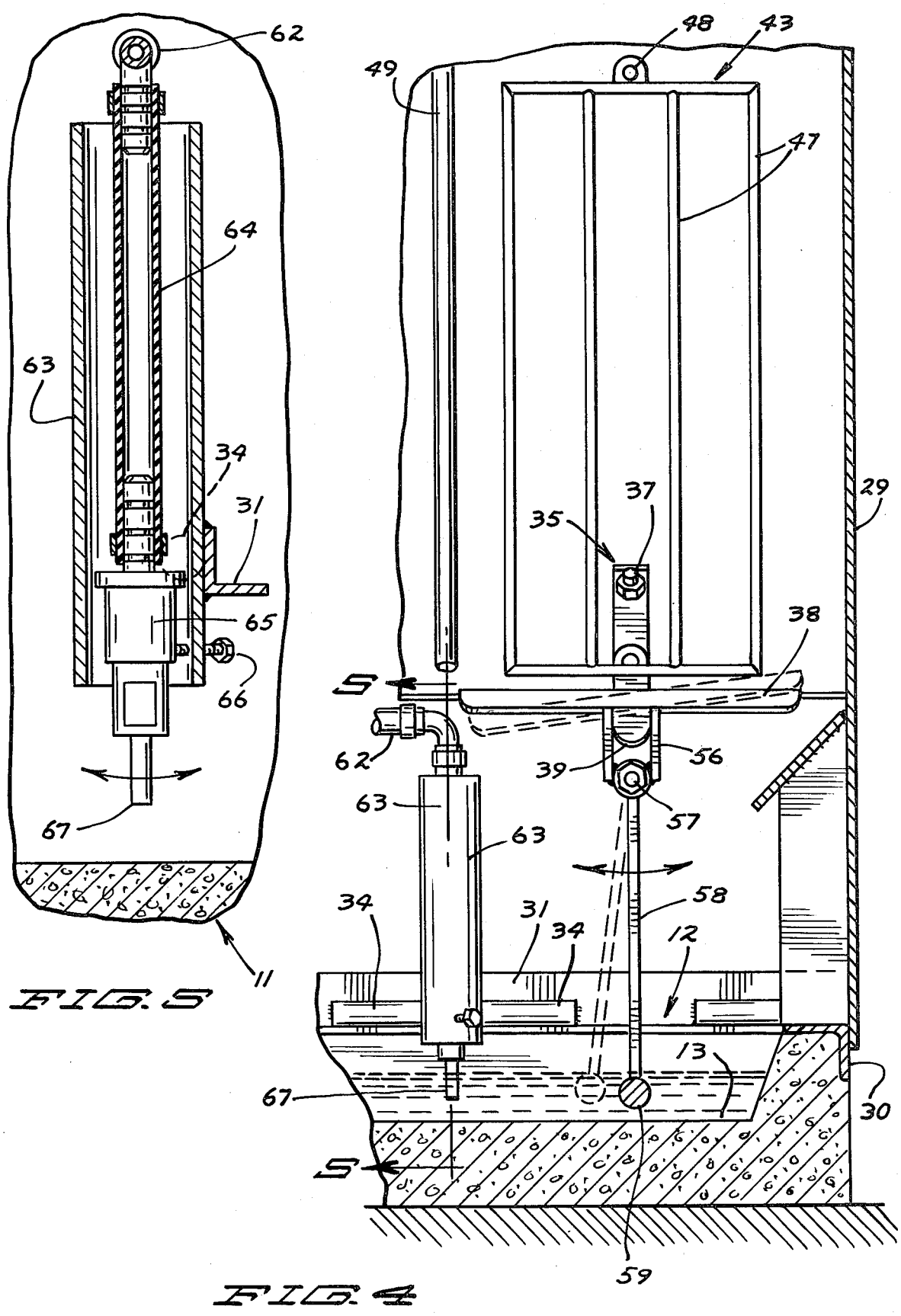

ANIMAL ACTUATED FEED AND WATER DISPENSING APPARATUS

BACKGROUND OF THE INVENTION

1. Field of the Invention

This invention relates to improvements in animal feeding apparatus and is more particularly directed to an animal actuated apparatus in which the flow of the feed and water, as desired by an animal, is completely under the control of the animal whereby the nutritional and life sustaining elements of food and water may be obtained according to the needs of an individual animal.

2. Description of the Prior Art

The prior art is replete with examples of various and sundry apparatus and devices for feeding and watering animals which supply varying amounts of particulate feed material as well as liquids, such as water, to a bunk or trough, for consumption by the animals.

The following is a list of prior art noted as pertinent to the invention of this disclosure;

| Patent Number | Inventor | Issue Date |
| --- | --- | --- |
| 1,334,075 | Borton | 3/16/20 |
| 1,362,974 | Wagner | 12/21/20 |
| 1,396,257 | Corington | 11/8/21 |
| 1,553,502 | Boyes | 9/15/25 |
| 2,234,112 | Emrick | 3/4/41 |
| 2,513,200 | Pax | 6/27/50 |
| 3,067,722 | Strong | 12/11/62 |
| 3,144,003 | Jacobs | 8/11/64 |
| 3,536,046 | Lippi | 10/27/70 |
| 3,812,823 | Ridder et al | 5/28/74 |
| 4,242,985 | Freeborn | 1/6/81 |

Of the patents noted above, the Wagner U.S. Pat. No. 1,362,974 for AUTOMATIC STOCK FEEDER is illustrative of one of many devices for delivering feed to an animal and the Lippi U.S. Pat. No. 3,536,046 for COMBINATION FEEDER AND WATERER FOR HOGS illustrates a combined water and feed device. The Freeborn U.S. Pat. No. 4,242,985 for ANIMAL ACTUATED FEEDER illustrates still another recent feeder of substantial complexity.

SUMMARY OF THE INVENTION

It is an object of this invention to provide an improved livestock feeding and watering apparatus that is reliable and uncomplicated in operation while permitting the stock to select portions and proportions of their solid and liquid dietary components in a manner determined by their needs and desire.

On one hand, my apparatus provides an animal controlled liquids despensing feature that is operative to prevent the accumulation of excessive amounts of liquids in relation to the amount of feed that may be dispensed into the feeding bunk, or trough. The apparatus of this invention further provides a simple, positive, dispensing-agitating function which insures that feed from a hopper is delivered under the control of the animal when needed or desired. As will be explained in more detail below, my invention further includes a means for agitating the feed contained in a hopper to prevent bridging or the like that may interfere with the continuous dispensing of the feed from the bottom of the supply hopper.

With these and other objects of this invention in mind, it may be seen that feed and water dispensing mechanisms are disposed over a trough, or bunk, whereby a hopper is provided with a longintudinally extending slot adjacent one bottom side and a plurality of feed dispensing elements containing portions that are operable through the slot between positions on either side of the slot and which may also include upwardly extending feed agitating means in the form of grates extending upwardly from and driven by the dispensing elements. Liquids dispensing means depend downwardly from the bottom of the hopper to actuators, therefor, that are disposed, with relationship to the bunk, to provide liquid dispensing operation, by an animal's snout, for example, in such a manner that the level of liquid that may be dispensed into the bunk is limited, through the animal's behavior, to a predetermined level.

BRIEF DESCRIPTION OF THE DRAWINGS

FIG. 4 is a sectional view of a portion of FIG. 3 taken along section line 4—4;

FIG. 5 is an enlarged sectional view of a portion of FIG. 1 taken along section line 5—5.

DESCRIPTION OF THE ILLUSTRATED EMBODIMENT

Figure 2:
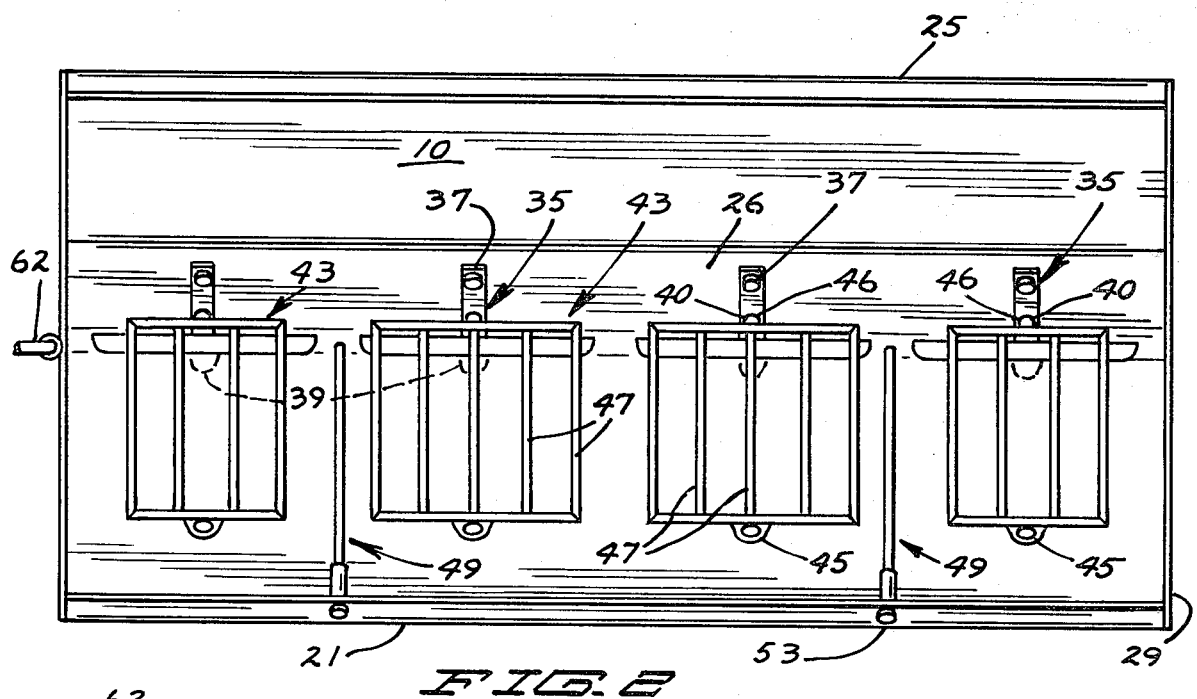
FIG. 2 is a top plan view of the apparatus shown in FIG. 1.

The feeding and watering apparatus of this invention is indicated generally by reference character 10 and is comprised of a bunk or trough, 11, disposed underneath a hopper indicated generally by reference character 20.

Bunk 11 may be of generally rectangular shape and is adapted to receive a volume of water and/or feed in amounts determined by the stock to be fed and includes a bottom portion 13 and a top portion 12 having suitable means, shown in the form of a peripherally disposed metallic angle 30, while the bunk itself may be comprised of suitable material, such as concrete or plastic.

Hopper 20 includes a front sloping wall 21 having a top 22 and a bottom 23; a sloping rear wall 25 that is provided with a bottom portion 26 of lesser slope, with respect to the horizontal plane of bunk 11 and which terminates in a forwardly extending edge, 27, that is disposed underneath and adjacent the lower portion 23 in front wall 21 to define an elongated slot, 24; and a pair of end walls 28 and 29 suitably shaped to extend downwardly into mounting engagement with a frame 30 on the top portion 12 of bunk 11 and are joined to front and rear walls 21 and 25 by suitable connectors, welding or the like. A plurality of leg members 33 are angularly disposed intermediate frame 30 on bunk 11 and suitable locations on front and rear walls 21 and 25 on hopper 20 so as to properly support the hopper in operative dispensing position above bunk 11.

A further vertical support plate 32 is shown disposed extending upwardly from a horizontally disposed angled support member 31 on frame 30, and is suitably connected to bottom portion 26 on rear wall 25.

A cruciform shaped dispenser-agitator bar 35 is shown rotatably disposed on a bolt 37 extending upwardly through bottom portion 26 of rear wall 25 and includes sidewardly extending wing portions 38 forming the principal cross-member, a forwardly extending tongue portion 39 for engagement with an actuator, and an upstanding pin member 40 extending toward the interior of hopper 20. The forward end of tongue 39 may be suitably shaped for engagement by an actuator and it may be noted that the wings 38 are disposed for movement into and out of slot 24 in front wall 21 as bar 35 is caused to rotate about bolt 37. The relative thickness of dispenser-agitator bar 35 may be determined, at least in part, by the relative size of the particulate feed material that is customarily supplied in the form of a dried granular food product. A plurality of hopper agitator grates 43 are shown disposed for rotation about bolt 45, extending through the top of front wall 21, at their top ends and are provided with an appropriately disposed apperture 46 at their lower ends, for operative engagement with pin 40 on dispenser-agitator bar 35 for actuation thereby. Hopper agitator grates 43 are shown as having a plurality of vertically extending bar member 47 and the entire grate may be seen to be operative in a plane substantially adjacent to and parallel with front wall 21 on hopper 20.

A feed regulator 49 is shown adjustably slideably disposed adjacent to slot 24 in front wall 21 and includes a generally horizontally disposed longitudinally elongated gate, or bar, 50, that is mounted on the lower end of an upwardly extending rod 51 that is provided with an adjustment means 52 (shown in the form of a threaded socket) that coacts with a bolt 53 extending through a flange at the top edge of front wall 21.

An actuator arm 55, for dispenser-agitator bar 35, is shown having a bifurcated top end 56 in operative engagement with tongue 39 and is rotatably disposed on a bolt 57 extending through vertical support plate 32 and includes a downwardly depending portion 58 emanating in a generally horizontally extending finger member 59 that is adapted to be engaged by an animal. It may be appreciated that actuator arm 55 provides a side to side motion that is limited in angular extent by the provisions of stop members 34 disposed on center frame member 31.

A liquids manifold 62 is shown extending from the top and horizontally underneath hopper for connection to a plurality of valves 65, in cylindrical support tubes 63 mounted upon and carried by center frame 31. Valves 65, having downwardly extending actuators 67, are removably disposed in the lower end of valve support tube 63 through one or more retaining bolts 66 and are shown connected to manifold 62 through hoses 64. Valve 65 and the lower end of support tube 63 are disposed a suitable vertical distance above the bottom 13 of bunk 11 to tend to inhibit the stock from actuating the valve after the level of liquid in bunk 11 has reached a predetermined desired depth.

A front cover plate 32A may be disposed to extend horizontally in opposed relationship with vertical support plate 32 to form a channel therebetween so that feed exiting from slot 24 in hopper 20 may fall downwardly therebetween and into the center of bunk 11.

With the above description in mind, it may be seen that my invention provides a multi-station animal feeding apparatus that may be used on the front and rear sides by a plurality of animals wherein a liquids dispensing means is disposed between adjacent feed stations and each of the feed stations is provided with a solids feed dispenser and both the liquids and solids dispensers may be operated by, for example, the snout of an animal from either the front or rear sides of the food receiving bunk, or trough. The liquids dispensing means provides an adjustable control over the normal level of fluid to be maintained, by the animals, in bunk 11 and may be reached from all sides and the feed dispensing means, including actuator arm 55 and finger 59 may be actuated from either the front or rear sides of bunk 11.

OPERATION OF THE ILLUSTRATED EMBODIMENT

Figure 1:
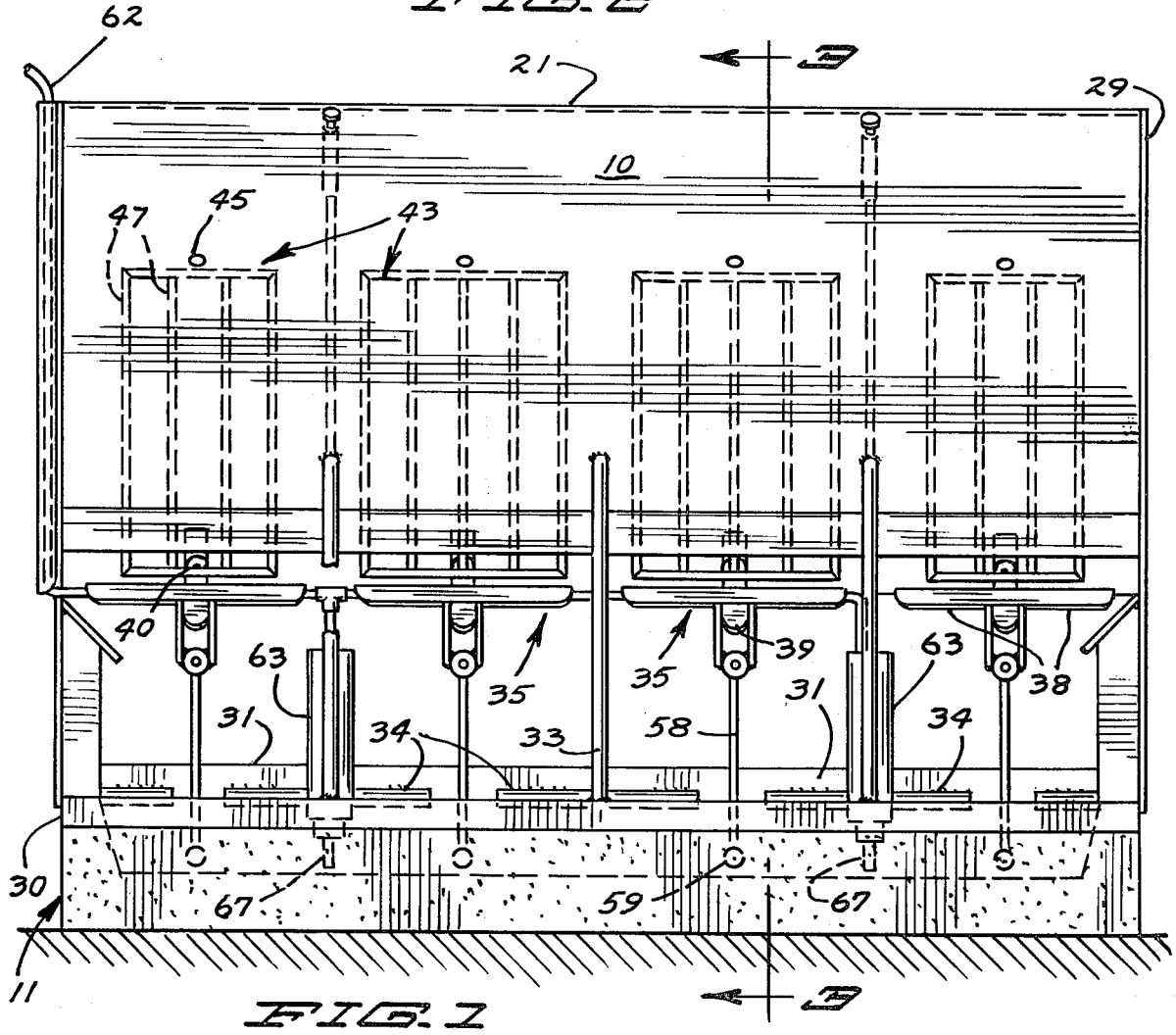
FIG. 1 is a side elevatinal view of an animal actuated feed and water dispensing apparatus.
Figure 3:
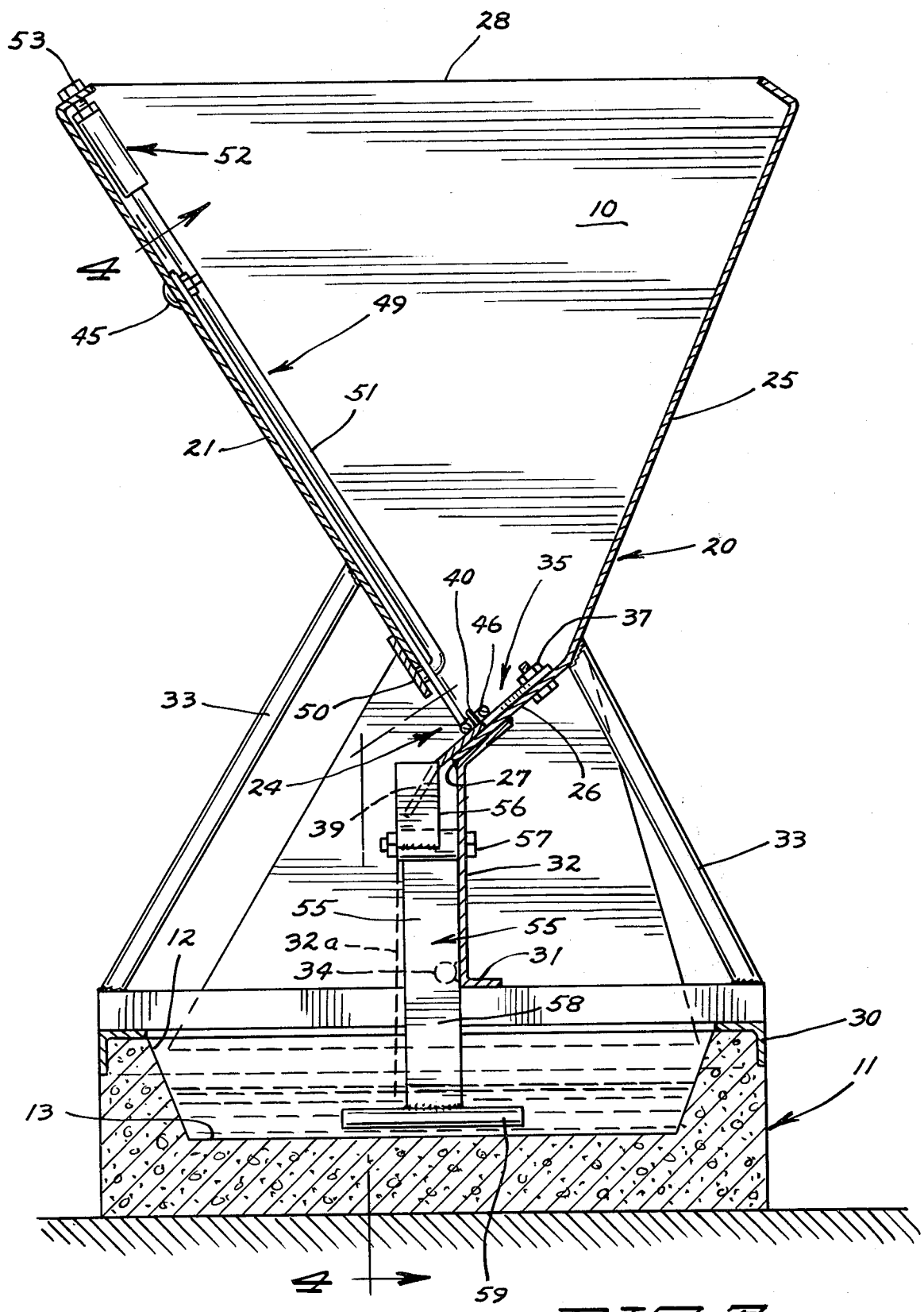
FIG. 3 is a sectional view of the apparatus shown in FIG. 1 taken along section line 3—3.

With the apparatus assembled as indicated in FIGS. 1 and 2, manifold 62 is connected to a suitable source of liquids under pressure and hopper 20 is filled with dry particulate feed material, appropriate for the type of livestock to be fed. Through instinct, hunger and thirst, the livestock may approach bunk 11 and engage valve finger 67 or actuator arm finger 59 to cause a flow of liquids and/or solids into bunk 11. The level of the liquids will be determined, to a large extent, by the disposition of the lower end of valve tube 63 above the bottom surface 13 on bunk 11 whereby, when the liquid rises to a level at which the nostrils of the snout of an animal become immersed, the animal will be inhibited from actuating valve finger 65 and the animal may then merely drink or may then direct its attention to finger 59 on actuator arm 55, again with its snout, causing dry feed to be dispensed from slot 24 into bunk 11. The dispensing of the feed from hopper 20 is effected by the to and fro sidewise motion of actuator arm 55 which causes a rotation of dispenser-agitator bar 35 about bolt 37 to cause wings 28 to alternately oscillate into and out of slot 24. The oscillatory, rotating motion of cruciform shaped dispenser-agitator bar 35 also causes a rotating oscillating motion of agitator grates 43 about bolts 45 to loosen material adjacent front wall 21 on hopper 20 and allow it to flow freely into proximity of dispenser-agitator bar 35. The opening defined by slot 24 at the bottom of front wall 21 on hopper 20 is adjustable and may be sized to coact with the thickness of dispenser-agitator bar 35 in relationship to the granular size of the particulate feed material. When suitably dimensioned and sized, the oscillating action of dispenser-agitator bar 35 through slot 24 effects a positive displacement, "pumping" action of the material sliding down the inside of front wall 21 into proximity of the inner portion of slot 24.

Thus, according to the needs and desires of the livestock, the individual animals may either drink or feed, or both, and may act according to their learning capacities to satiate their appetites in a manner that is pleasing to their tastes.

I claim:
1. Hog feeding apparatus comprising, in combination:
   a horizontal bunk for receiving feed and water, for access by hogs to be fed;
   hopper means having opposite walls with spaced lower edge portions defining an elongate slot therebetween disposed over said bunk so that feed, dispensed through said slot is distributed into said bunk;
   feed dispensing means including elongate wing bars overlying the lower edge portion of one of the walls and disposed in said slot and extending longitudinally along the slot, said elongate wing bars being oscillatable transversely in the slot to carry feed thereover to be dispensed, said elongate slot and said feed dispensing means being dimensioned to permit feed to pass through the slot on top of said feed dispensing means only upon oscillation thereof; and actuating means operably connected to said feed dispensing means to oscillate the wing bars transversely in the slot and including an operator arm extending downwardly into said bunk to be operated by the head of a hog so as to allow the dispensing of adequate feed by the hog without allowing waste by overworking the operator arm.

2. The apparatus of claim 1 wherein said opposite hopper walls include an obverse wall and a reverse wall, and an adjustable gate lying and moving virtually parallel to the obverse hopper wall adjacent to the elongate slot, and the feed dispensing means is disposed on said reverse wall and opposite the gate.

3. The apparatus of claim 1 wherein the operator arm on the actuating means includes lever means, including fulcrum means disposed to provide operation of the feed dispensing means.

4. The apparatus of claim 1 in which the operator arm includes an upright, downwardly extending lever arm having a bifurcated upper end and being rotatably disposed on a lever pivot located underneath said bifurcated upper end.

5. The apparatus of claim 1 and a hog regulated water supply disposed over the bunk and including a valve connected to a source of water, said valve including a downwardly depending lever means extending into proximity to the bottom of the bunk and adjustable shield means are disposed around the actuator to extend into the bunk to a desired, predetermined water level in said bunk.

6. The apparatus of claim 1 in which the feed dispensing means includes an agitator on the other of the walls of the hopper means, said agitator being operable simultaneously with the actuation of the feed dispensing means.

7. The apparatus of claim 6 in which the agitators are connected to the elongated wing bars through linkage means to coordinate the movement of the wing bars and the agitators over both hopper walls.

8. The apparatus of claim 7 in which the linkage means is operable to effect movement of the agitators in different directions with respect to the wing bars.

9. Hog feeding apparatus comprising, in combination:
   a horizontal bunk for receiving feed and water, for access by hogs to be fed;
   hopper means having inclined opposite walls with spaced lower edge portions defining an elongated slot disposed over said bunk so that feed, dispensed through said slot is distributed into said bunk;
   feed dispensing means disposed at all times in said slot and movable outwardly, forwardly of said slot, said feed dispensing means being of uniform thickness and said slot being dimensioned to permit particles of predetermined size to pass through said slot on said feed dispensing means only when said feed dispensing means is moved outwardly of said slot; and
   actuating means operably connected to said feed dispensing means and including an operator arm extending downwardly into said bunk to be operated by the head of a hog so as to allow the dispensing of adequate feed by the hog without allowing waste by overworking the operator arm.

10. The apparatus of claim 9 in which the feed dispensing means is disposed for operation on top of and parallel with one of said walls on the hopper means and the other of said walls is disposed at a greater vertical angle with respect to said one of said walls.

11. The apparatus of claim 10 in which the one of said walls is disposed at an angle of 35° to 55° with respect to the horizontal bunk.

* * * * *